United States Patent [19]
Fehrle et al.

[11] Patent Number: 5,199,833
[45] Date of Patent: Apr. 6, 1993

[54] HAND HELD POWER TOOL WITH REMOVABLE TOOL HOLDER

[75] Inventors: Siegfried Fehrle; Wilfried Kabatnik, both of Leinfelden-Echterdingen; Manfred Buck, Nuertingen; Karl Wanner, Leinfelden-Echterdingen, all of Fed. Rep. of Germany

[73] Assignee: Robert Bosch GmbH, Stuttgart, Fed. Rep. of Germany

[21] Appl. No.: 816,817

[22] Filed: Jan. 3, 1992

[30] Foreign Application Priority Data

Jan. 5, 1991 [DE] Fed. Rep. of Germany ....... 4100186

[51] Int. Cl.$^5$ ...................... B23B 31/107; B23B 45/16
[52] U.S. Cl. .............................. 408/239 R; 279/19.3; 279/905
[58] Field of Search .................. 279/19, 19.3-19.5, 279/22, 905; 408/239 R, 240

[56] References Cited

U.S. PATENT DOCUMENTS 4,131,165 12/1978 Wanner et al. ................ 279/19.3 X
4,824,298 4/1989 Lippacher et al. .................. 408/240

Primary Examiner—Steven C. Biship
Attorney, Agent, or Firm—Michael J. Striker

[57] ABSTRACT

A hand held power tool has a rotatable spindle, a tool holder arranged on the spindle, a tool inserted in the tool holder, locking members fixing the tool holder with the spindle and engaging both in the tool holder and the spindle, a rotatable ring holding the locking members in its locking position and provided with depressions for receiving the locking members not locking position, and a gripping sleeve connected with the ring and operating simultaneously as an actuating member for unlocking the tool inserted in the tool holder.

7 Claims, 2 Drawing Sheets

HAND HELD POWER TOOL WITH REMOVABLE TOOL HOLDER

BACKGROUND OF THE INVENTION

The present invention relates to a hand held power tool with a removable holder.

European patent document EP-B-0 265,378 discloses a hand held device in which a tool holder is retained by locking bolts and a rotatable supporting ring. In this device there is the danger that the locking elements during exchange of the tool holder can be lost since it is not retained in a form-locking manner in any of the parts. The tool holder is obviously formed as a simple drill chuck whose actuating elements are not described.

SUMMARY OF THE INVENTION

Accordingly, it is an object of the present invention to provide a hand held power tool which avoids the disadvantages of the prior art.

In keeping with these objects and with others which will become apparent hereinafter, one feature of the present invention resides, briefly stated, in a hand held power tool especially for drilling, impact drilling or screwing, which has a tool holder which can be fitted on a rotatably driven spindle of the machine and fixed by locking elements such as bolts or rollers engaging both in the spindle and the tool holder, and which is held in its locking position by a rotatable ring with recesses for inserting the locking elements in their not locking position wherein in accordance with the invention the ring is non-rotatably connected with a rotatable gripping sleeve which simultaneously serves as an actuating member for unlocking the tool inserted in the tool holder.

When the hand held power tool is designed in accordance with the present invention, both the tool and the tool holder can be exchanged very easily by an operator. Both parts are actuated by the single actuating element which can both release the tool holder from the spindle and unlock the tool. For this purpose a gripping sleeve which is both rotatable and axially displaceable, is utilized.

In accordance with a specially advantageous feature of the present invention, a torsion spring is arranged between the gripping sleeve and the base body of the tool holder, and urges the gripping sleeve to its locking positions. The torsion spring applies its force both in the rotary direction about its axis and also axially in direction of its axis. The spring has also the advantage that with a single structural element both the locking of the tool holder and also of the tool can be provided.

The facilitation of the mounting of the tool is achieved when the end of the spindle is provided with open longitudinal grooves in which a part of the locking memebrs is engaged before they reach the closed depression for locking. Upon engagement of at least one locking member in at least one of these longitudinal grooves, the tool holder is fixed on the spindle non-rotatable relative to the latter. Therefore during rotation on the gripping sleeve the ring can be turned to its rotary position for receiving the locking body. It is especially advantageous when the locking members are held in the passages of the base body so that they cannot fall out.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
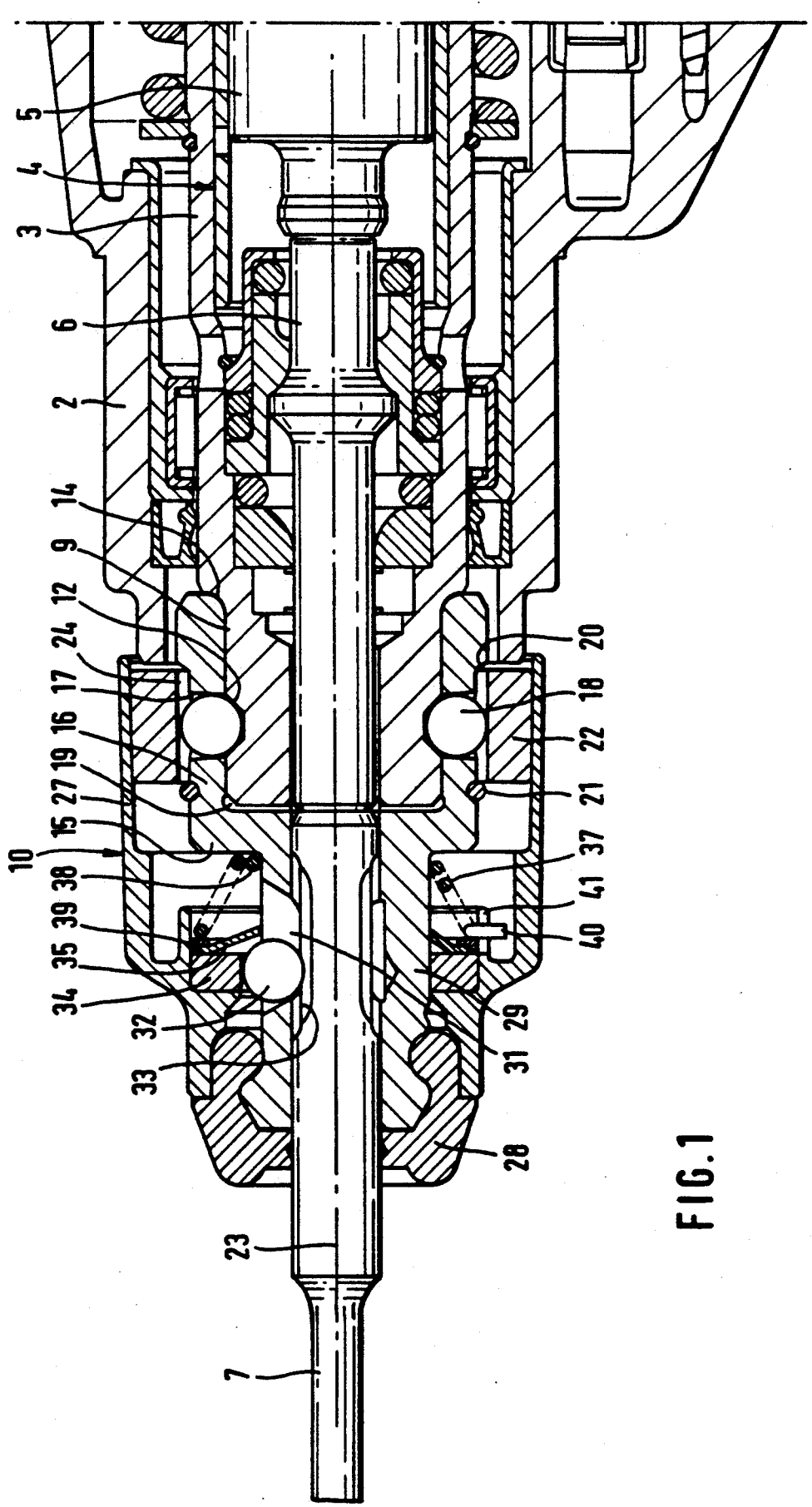
FIG. 1 is a view showing a section of a front part of the hammer drill in accordance with the present invention.
Figure 2:
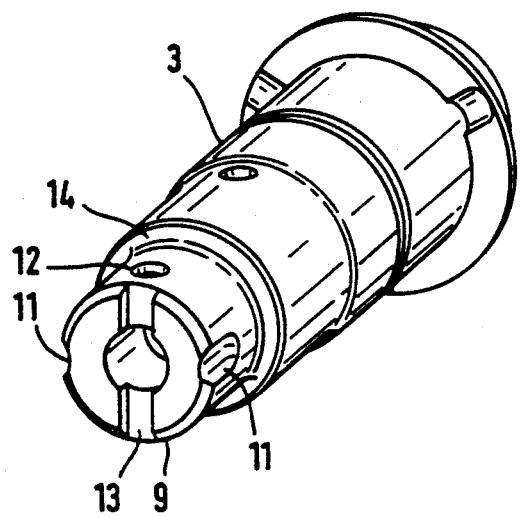
FIG. 2 is a view showing a detail of a spindle of the inventive hammer drill.

A hammer drill in accordance with the present invention has a housing which is identified with reference numeral 2. A hollow spindle or hammer pipe 3 is driven from a not shown motor and supported in the housing 2. An impact mechanism 4 with a striker 5 and an anvil 6 is arranged inside the spindle 3 and delivers axial impacts to the tool 7. The front end 9 of the spindle 3, the end provided at the tool side, is cylindrical and provides on the outer periphery a seat for fitting-on of a tool holder 10. The spindle end 9 has two longitudinal grooves 11 which are open at its end and also two round closed frustoconical depressions 12 which are preferably offset by 90° from one another. A shaped groove 13 is provided at the end side of the spindle 3. The spindle end 9 is completed with a collar 14 formed so that in the mounted condition the tool holder 10 abuts with its base body 15 against the collar.

Figure 3:
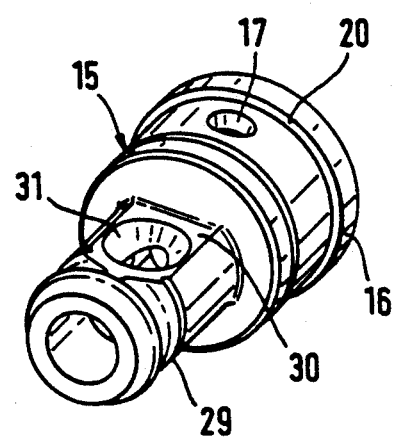
FIG. 3 is a view showing a base body of a tool holder of the inventive hammer drill.

The base body 15 has the shape of an offset sleeve as shown in FIG. 3. A part 16 with a greater inner diameter forms a seat for the end 9 of the spindle 3. The part 16 has four passages 17 for receiving locking members 18. The passages 17 correspond to the longitudinal grooves 11 and the depressions 12. They narrow inwardly towards the spindle 3. Two oppositely located passages 17 at the end of the base body 15 facing the machine side are closer than the other two passages. Therefore, during the mounting the locking members 18 located in them first engage into the open longitudinal grooves 11. Inside the part 16 the base body 15 has cams 19 which form-lockingly engage in the shaped groove 13 to transfer a torque to the tool holder 10.

Figure 4:
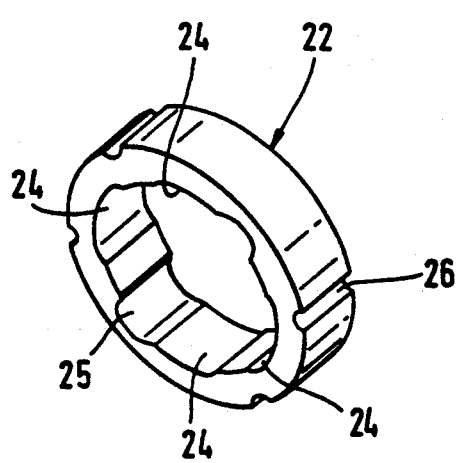
FIG. 4 shows a ring of the hammer drill in accordance with the present invention.

A projection 20 is provided on the outer periphery of the part 16. A ring 22 is axially held on the projection 20 and on a spring ring 21. The ring 22 overlaps the locking members 18 and is rotatable about a central axis 23 of the tool holder 10. The ring 22 at its inner side has four rotation-symmetrically distributed recesses 24. Two of these recesses have depressed pockets 25 in a partial region, as is shown in FIG. 4. Longitudinal notches 26 are provided on the outer periphery of the ring 22 and serve for non-rotatable connection with a gripping sleeve 27. The gripping sleeve 27 abuts with its front end against a dust cap 28 which is fitted on the base body 15 of the tool holder 10.

A front part 29 of the base body 15 forms a receiving opening for holding and locking the tool 7. For this purpose it has at its side a flattening 30 with an opening 31 for receiving a locking ball 32. The latter engages in a closed groove 33 of the tool 7. The locking ball 32 is held in its locked position by a holding ring 34 which is arranged in the gripping sleeve 27 and is axially displaceable within a limited distance. In addition to the holding ring 34, also a holding plate 35 is arranged and also axially displaceable within a limited distance. It abuts against the flattening 30 so that it can be engaged by the locking ball 32.

The gripping sleeve 27 is composed of synthetic plastic material and overlaps the greater part of the base body 15. It is rotatable and axially displaceable relative to the base body 15.

Figure 5:
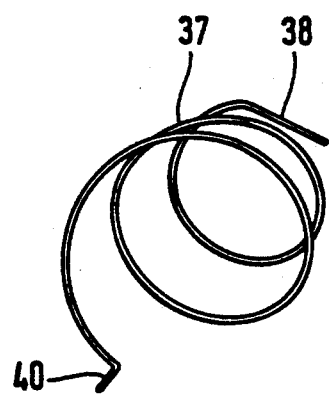
FIG. 5 is a view showing a spring of the hammer drill in accordance with the present invention.

In FIG. 1 the gripping sleeve 27 is shown in its position in which it locks both tool holder 10 and the tool 7. This position is caused by a torsion spring 37 shown in FIG. 5. It supports with its one side against the base body 15, or in other words its extended end 38 lies in a kind of form-locking against the flattening 30. The end 38 can also engage in blind hole formed in the base body 15 in accordance with another not shown embodiment. In any case the end 38 is connected with the base body 15 in a non-rotatable manner relative to the latter. At the other end the torsion spring 37 abuts against an angled disc 39 which abuts against the gripping sleeve 27 or a holding ring 34. The disc 39 has the function to transfer the pressure force of the spring 32 to the holding plate 35 during withdrawal of the locking ball 32, on the one hand, and to provide a substantially friction-less rotary movement of the parts 28, 34, 37. The torsion spring 37 extends with its second radially projecting end 40 into an axial slot 41 of the gripping sleeve 27. The torsion spring 37 is formed as a conical spiral spring. It operates both as a torsion spring and as a pressure spring.

The gripping sleeve 27 and the torsion spring 37 have a double function and serve both for locking and unlocking the tool 7 and also for locking and unlocking the tool holder 10 relative to the spindle 3. For fitting-on of the tool holder 10 it is placed on the end 9 of the spindle 3 and turned until both locking members 18 which narrow to the end engage in the longitudinal grooves 11. Thereby the base body 15 becomes non-rotatably connected with the spindle 3. By further turning on the gripping sleeve 27 the ring 22 is rotated so that both other locking members 18 fall in the pocket 25 of the ring 22. Now the tool holder 10 can be displaced until its abutment against the collar 14 of the spindle 3. During releasing of the gripping sleeve 27 it rotates with the ring 22 due to the torsion force of the spring 37 back again, until it reaches the locked position shown in FIG. 1. For removing the tool holder 10 the gripping sleeve is turned until the locking members 18 fall in the pocket 25. The tool holder 10 is then axially withdrawn from the spindle.

In order to insert the tool 7 into the tool holder 10, it is inserted with its shaft into the receiving opening. The shaft end pushes the locking ball 32 rearwardly against the holding plate 35. It deviates axially against the force of the torsion spring 37. When the locking ball 32 falls in the groove 33 of the tool 7, the torsion spring 37 urges the holding plate 35 again to the initial position shown in FIG. 1. For removing the tool 7 the gripping sleeve 27 is pulled axially in direction to the impact mechanism 4. Thereby the holding ring 34 which prevents radial deviation of the locking ball 32 is withdrawn from it. The locking ball 32 can then deviate into the radially open gripping sleeve 27 and therefore the tool 7 can be withdrawn from the tool holder 10.

The invention is not limited to the shown example. Especially more or less than four locking members can be provided. The shaped groove 13 and the notches 19 can be dispensed with when the torque is sufficiently transmitted through for example roller-shaped blocking members 32. For reducing the friction between the gripping sleeve 27 and the dust cap 28 a slidign layer, a sliding film or a sliding ring can be inserted between them. The tool holder 10 can be formed differently for other tool shafts. For example a drill chuck or holder for a tool with spline shaft can be provided.

It will be understood that each of the elements described above, or two or more together, may also find a useful application in other types of constructions differing from the types described above.

While the invention has been illustrated and described as embodied in a hand held power tool, especially for drilling, impact drilling or screwing, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims:

1. A hand held power tool, comprising a rotatable spindle; a tool holder arranged on said spindle; a tool inserted in said tool holder; locking means fixing said tool holder with said spindle and engaging both in said tool holder and said spindle; a rotatable ring holding said locking means in its locking position and provided with depressions for receiving said locking means in it snot locking position; and a gripping sleeve connected with said ring and operating simultaneously as an actuating member for unlocking said tool inserted in said tool holder, said tool holder having a base body, said gripping sleeve being arranged rotatably and axially displaceably on said base body of said tool holder.

2. A hand held power tool as defined in claim 1, and further comprising a torsion spring arranged between said gripping sleeve and said base body and urging said gripping sleeve to its position in which it locks said tool holder.

3. A hand held power tool as defined in claim 2, wherein said torsion spring arranged between said gripping sleeve and said base body is compressed in direction of its axis and urges said gripping sleeve to its axial position for locking said tool.

4. A hand held power tool as defined in claim 2, wherein said torsion spring has one end which is nonrotatably connected with said tool holder and another end which is nonrotatably connected with said gripping sleeve.

5. A hand held power tool as defined in claim 2, wherein said torsion spring is formed as a conical spring.

6. A hand held power tool as defined in claim 2, and further comprising a holding plate and a disc which rotates together with said gripping sleeve, said torsion spring being axially supported against said holding plate through said disc.

7. A hand held power tool as defined in claim 1, wherein said spindle has an end facing said tool and provided with at least one open longitudinal groove in at least one closed depression for engaging one of said locking means in each of said longitudinal groove and said depression.

* * * * *